United States Patent
Guo et al.

(10) Patent No.: US 10,424,938 B2
(45) Date of Patent: Sep. 24, 2019

(54) POWER SUPPLY SYSTEM

(71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventors: Naijia Guo, Beijing (CN); Jianzi He, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu (CN)

( * ) Notice: Subject to any disclaimer, the term of this patent is extended or adjusted under 35 U.S.C. 154(b) by 307 days.

(21) Appl. No.: 14/896,550

(22) PCT Filed: May 20, 2014

(86) PCT No.: PCT/CN2014/077904
§ 371 (c)(1),
(2) Date: Dec. 7, 2015

(87) PCT Pub. No.: WO2015/070583
PCT Pub. Date: May 21, 2015

(65) Prior Publication Data
US 2016/0134123 A1   May 12, 2016

(30) Foreign Application Priority Data
Nov. 15, 2013 (CN) .......................... 2013 1 0573353

(51) Int. Cl.
*H02J 1/00* (2006.01)
*H02J 4/00* (2006.01)
(Continued)

(52) U.S. Cl.
CPC ................ *H02J 4/00* (2013.01); *H02J 9/061* (2013.01); *G09G 2330/00* (2013.01); *H04N 5/63* (2013.01)

(58) Field of Classification Search
CPC .......... G06F 1/3203; G06F 1/26; H02J 9/005; Y02B 70/16; H01L 2924/0002; H01L 2924/00
See application file for complete search history.

(56) References Cited

U.S. PATENT DOCUMENTS 5,961,648 A   10/1999   Choi et al.
6,314,009 B1   11/2001   Dittmer et al.
(Continued)

FOREIGN PATENT DOCUMENTS

| CN | 101106040 A | 1/2008 |
| CN | 101246664 A | 8/2008 |

(Continued)

OTHER PUBLICATIONS

Extended European Search Report dated May 22, 2017; Appln. No. 14862327.5-1804/3070706 PCT/CN2014077904.
(Continued)

*Primary Examiner* — Sibin Chen
(74) *Attorney, Agent, or Firm* — Ladas & Parry LLP

(57) ABSTRACT

A power supply system having a simple structure and being easy to maintain, used to supply power for electronic devices, and including at least two first power sources connected in parallel and supplying power for the electronic devices; each first power source in the power supply system has a simple structure, and is easy to maintain, thus enabling the entire power supply system to have a simple structure and to be easy to maintain.

12 Claims, 3 Drawing Sheets

(51) Int. Cl.
*H02J 9/06* (2006.01)
*H04N 5/63* (2006.01)

(56) References Cited

U.S. PATENT DOCUMENTS

| | | | |
|---|---|---|---|
| 2008/0298105 A1* | 12/2008 | Kashima | H02M 1/32 363/126 |
| 2009/0284993 A1* | 11/2009 | Zheng | H02M 3/3385 363/21.08 |
| 2009/0322301 A1 | 12/2009 | Chang | |
| 2010/0077238 A1* | 3/2010 | Vogman | G06F 1/263 713/310 |
| 2010/0164292 A1 | 7/2010 | Freeman et al. | |
| 2011/0298279 A1* | 12/2011 | Dimrco | H02J 9/005 307/31 |
| 2013/0049463 A1* | 2/2013 | Shih | H02J 1/102 307/23 |

FOREIGN PATENT DOCUMENTS

| | | |
|---|---|---|
| CN | 101582591 A | 11/2009 |
| CN | 101645223 A | 2/2010 |
| CN | 101697094 A | 4/2010 |
| CN | 201674276 U | 12/2010 |
| CN | 201936548 U | 8/2011 |
| CN | 202258271 U | 5/2012 |
| CN | 103559872 A | 2/2014 |
| JP | 09-179526 A | 7/1997 |

OTHER PUBLICATIONS

International Search Report and Written Opinion both dated Aug. 11, 2014; PCT/CN2014/077904.
First Chinese Office Action dated Sep. 28, 2014; Appln. No. 201310573353.6.
Second Chinese Office Action dated Nov. 27, 2014; Appln. No. 201310573353.6.

* cited by examiner

POWER SUPPLY SYSTEM

TECHNICAL FIELD

The present disclosure relates to a power supply system.

BACKGROUND

As sizes of electronic devices are becoming bigger and bigger, a large-sized electronic device has relatively high power in normal operation, and correspondingly has higher and higher requirements on a power supply system.

For example, in the display technology field, generally, a supersized display device may have the size up to 110 inches or more, and its power consumption in normal operation may be multiple times than a middle-sized or small-sized (less than about 50 inches) display device. If a known power supply system applicable to the middle-sized or small-sized display device is used for supplying power to the supersized display device, it cannot meet needs of the supersized display device.

It is known to inventors that, usually a supersized electronic device, for example, a supersized television, is separately powered by a power supply system that is large-sized and complex in structure. In order to meet the electricity demand of a high-power electronic device, the power supply is provided with a plurality of high performance transformers and a plurality of rectifying filtering modules. Firstly, the known power supply described above is large in size and complex in structure, and has relatively high requirements on a producing process, resulting in higher failure rate, which cannot meet market and production demands. Secondly, because the power supply is complex in structure, the maintenance and management for it become more difficult in future. In addition, since all the plurality of transformers and the plurality of rectifying filtering modules are integrated into one power supply, a cooling effect is poor.

SUMMARY

An embodiment of the present disclosure provides a power supply system, for providing a power supply system which is simple in structure and convenient to maintain.

The power supply systems provided by the embodiments of the present disclosure, for supplying power to an electronic device, comprising: at least two first power supplies connected with each other in parallel for supplying power to the electronic device.

In some embodiments, the power supply system further comprises a control module arranged in the electronic device or arranged between the electronic device and the first power supplies, configured for controlling turn-on and turn-off of the first power supplies based on an amount of electrical power required, which amount is fed back by the electronic device.

In some embodiments, the power supply system further comprises a second power supply connected with the first power supplies in series, configured for supplying power to the electronic device.

In some embodiments, the second power supply is configured for supplying a standby voltage to the electronic device when the electronic device is in a standby state.

In some embodiments, the power supply system further comprises a control module arranged in the second power supply or arranged between the second power supply and the first power supplies, configured for controlling turn-on and turn-off of the first power supplies based on the amount of electrical power required, which amount is fed back by the electronic device through the second power supply.

In some embodiments, the power supply system further comprises a second power supply connected with the first power supplies in parallel, configured for supplying power to the electronic device; the second power supply being configured for supplying a standby voltage to the electronic device before the electronic device is turned on or when the electronic device is turned off.

In some embodiments, the power supply system further comprises a control module arranged in the electronic device or arranged between the electronic device and the first power supplies plus the second power supply, configured for controlling turn-on and turn-off of the first power supplies and the second power supply based on the amount of electrical power required, which amount is fed back by the electronic device.

In some embodiments, each first power supply at least includes a first rectifying filter for receiving an AC voltage, a transformer connected with the first rectifying filter, and a second rectifying filter connected with the transformer, configured for outputting a power supply voltage.

In some embodiments, the control module is a control integrated chip or a gate circuit.

In some embodiments, the respective first power supplies and the second power supply correspond to a plurality of power interfaces arranged on the electronic device one-to-one, respectively.

An embodiment of the present disclosure provides a power supply system, for supplying power to an electronic device, comprising: at least two first power supplies connected with each other in parallel for supplying power to the electronic device. The electronic device is powered by at least two first power supplies which are independent of each other, and each first power supply is simple in structure and convenient to maintain, so that the entire power supply system is of a simple structure and can be conveniently maintained.

DETAILED DESCRIPTION

An embodiment of the present disclosure provides a power supply system, for providing a power supply system which is simple in structure and convenient to maintain.

In the embodiment of the present disclosure, an electronic device is powered by at least two first power supplies which are independent of each other, the respective first power supplies are simple in structure and convenient to maintain, and correspondingly, the entire power supply system is of a simple structure and can be conveniently maintained. Further, a control module controlling turn-on and turn-off of the first power supplies according to an electricity demand of the electronic device at that time (currently) is arranged between the first power supplies and the electronic device, so as to flexibly control the working states of the first power supplies (turning-on or turning-off).

The types of the electronic devices are not limited here; because the power supply system comprises a plurality of first power supplies which are independent of each other, it is applicable to electronic devices of different types and different powers. For example, when the electronic device is a display device, the power supply system is applicable to small-sized, middle-sized, large-sized and super-sized display devices respectively.

Hereinafter, the power supply systems provided by the embodiments of the present disclosure will be described in conjunction with the accompanying drawings through various examples.

First Embodiment

Figure 1:
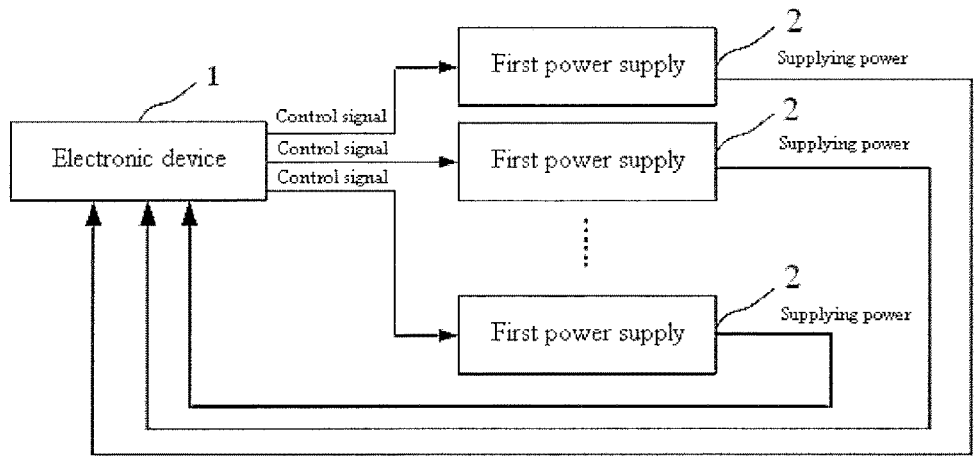
FIG. 1 is a structural schematic diagram of a power supply system provided by a first embodiment of the present disclosure.

With reference to FIG. 1, a power supply system provided by the first embodiment of the present disclosure comprises: at least two first power supplies 2 connected with each other in parallel for supplying power to an electronic device 1. For example, respective first power supplies 2 are both connected with the electronic device 1, and supply power to the electronic device 1 simultaneously.

One of implementation modes in which the respective first power supplies 2 are both connected with the electronic device 1 is that: the respective first power supplies 2 are correspondingly connected with a plurality of power interfaces arranged on the electronic device 1 one-to-one through power lines connected thereto. Each power interface at least includes one live line interface and one naught line interface; and the power interface and a known power interface are similar in structure and function, which will be not repeated here. In addition, the power supply interfaces and the electronic device have at least two connection manners.

In the first manner, the power interfaces may be connected with a System-On-Chip (SOC, also called as TV SOC), the SOC controls current signals to supply power to a certain or several functional modules (the functional modules may be, but not limited to, a timing control circuit, a backlight driving circuit, an acoustic system circuit, etc.) in the electronic device after receiving the current signals provided by the respective power supplies. After receiving the currents provided by the plurality of first power supplies 2, the electronic device 1 inputs currents, which are provided by the plurality of first power supplies 2, into corresponding functional modules in the electronic device 1 simultaneously to achieve the purpose of driving the whole device to work.

In the second manner, the power interfaces may be connected with the functional modules in the electronic device, and the first power supplies 2 directly supply power to the functional modules connected thereto, achieving the purpose of supplying power to corresponding functional modules, respectively.

Here, the structure of the electronic device 1 is not limited; the number of the first power supplies 2 is not limited; the structures of the first power supplies 2 are not limited, and the first power supplies 2 may be a known power supply including at least components such as a transformer, a rectifying filter and so on.

In the present disclosure, the electronic device 1 is powered by at least two first power supplies 2, the respective first power supplies 2 are independent of each other, and the first power supplies 2 are simple in structure and convenient to maintain, so that the entire power supply system is of a simple structure and can be conveniently maintained.

Hereinafter, an example in which the electronic device is a TV and the power interfaces supply power to respective functional modules in the TV through a SOC is taken for description.

With reference to FIG. 1, respective first power supplies 2 are connected with a SOC in a TV; when the TV SOC is powered on, the TV SOC transmits control signals (e.g., high-level voltage signals) to the respective first power supplies 2; the first power supplies 2 have a power supply state change from an off state to an on state when triggered by the high-level voltage signals; respective groups of voltages in the first power supplies 2 are output to the TV SOC normally, to supply power for the normal display of the TV. An appropriate number of first power supplies 2 should be determined according to a size of a TV.

For example, a first power supply 2 is provided with a switching control circuit, and the switching control circuit is configured for controlling the output of power supply voltage according to the received triggering signals. Generally, the switching control circuit may be, but not limited to, a chip or gate circuits.

It should be noted that, for the at least two first power supplies as illustrated in FIG. 1, one may be set as a main power supply, and the other one may be set as a secondary power supply; the main power supply provides a standby power supply voltage to the electronic device before the SOC of the electronic device is powered on or after the SOC is powered off.

Figure 2:
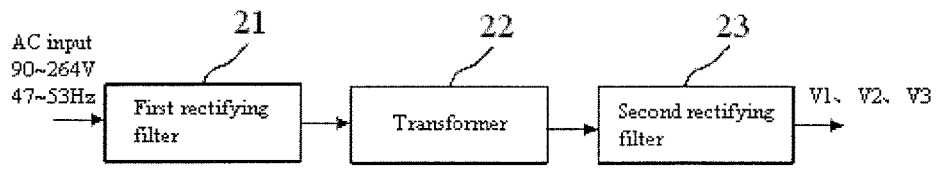
FIG. 2 is a structural schematic diagram of a first power supply provided by the first embodiment of the present disclosure.

With reference to FIG. 2, FIG. 2 is a structural schematic diagram of a first power supply 2 illustrated in FIG. 1.

The first power supply at least includes: a first rectifying filter 21, a transformer 22, and a second rectifying filter 23; for example, after obtaining input of an AC voltage (as shown in FIG. 2, obtaining an AC voltage input of 90~264V, 47~53 Hz), the first rectifying filter 21 rectifies and filters the AC voltage; the rectified and filtered voltage is output to the transformer 22, and the voltage transformed by the transformer 22 is rectified and filtered by the second rectifying filter 23 again, outputting a power supply voltage applicable to the electronic device.

The first power supply outputs multiple voltages at the same time or output one voltage, and as illustrated in FIG. 2, outputs three voltages to the second rectifying filter 23 at the same time, which voltages are V1, V2 and V3, respectively; according to actual needs, values of V1, V2 and V3 may be same as each other or may be different from each other.

It should be noted that, an example in which the electronic device is a TV and the power interfaces supply power to respective functional modules in the TV through a SOC is taken for description. For example, the electronic device is not limited to a TV, and the power interface may also be directly in signal communication with respective functional modules in the electronic device. When the respective functional modules are powered on, level signals trigger the switches of the first power supply connected thereto to control turn-on or turn-off of a circuit, and control respective groups of voltages of the first power supply to be normally output if necessary.

Second Embodiment

Figure 3:
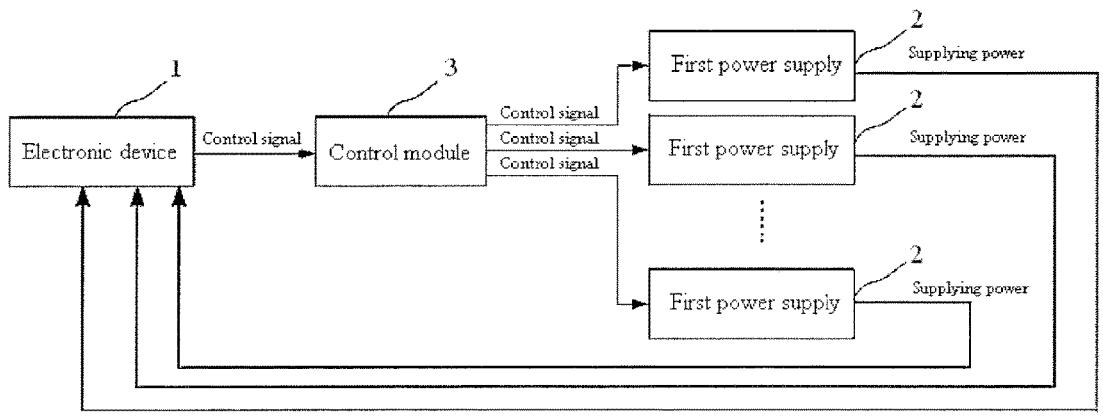
FIG. 3 is a structural schematic diagram of a power supply system provided by a second embodiment of the present disclosure.

Further, in order to make the power supply system provided by the first embodiment flexibly applied to various electronic devices of different sizes or different power consumptions, with reference to FIG. 3, on the basis of the power supply system (corresponding to FIG. 1) provided by the first embodiment, a power supply system provided by the second embodiment of the present disclosure further comprises: a control module 3 arranged in the electronic device 1 or arranged between the electronic device 1 and the first power supplies 2, and the control module 3 is configured for controlling to turn on and turn off of the first power supplies 2 based on the amount of electrical power required by the electronic device 1 at that time.

The structure and type of the control module 3 is not limited, for example, may be a control Integrated Chip (control IC) serving as a switch, or a gate circuit.

The control module 3 may be arranged on a SOC of the electronic device 1, for example, may be arranged on a SOC 1 of a TV, or may be arranged between the electronic device 1 and the first power supplies 2; in the power supply system shown in FIG. 3, the control module 3 is arranged between the electronic device 1 and the first power supplies 2; for example, a position of the control module 3 in the power supply system is determined according to factors such as actual needs, convenience in implementation and so on.

For example, after the electronic device 1 is powered on, the control module 3 obtain power consumption information of the electronic device 1 in real time, for example, the control module 3 may obtain the power consumption information based on the state of the electronic device 1 or the function enabled in the electronic device 1, that is, obtain the amount of required power consumption, and power supply states of the respective power supplies 2 may be controlled in real time according to the power consumption, so that a certain first power supply or several first power supplies will be turned on if necessary, and be turned off if not necessary. The power supply states of the first power supplies 2 are controlled by the control module 3 by controlling the switching control circuits in the first power supplies 2.

The control module 3 controls the power supply states of the respective first power supplies 2, for example, the control module 3 can detect the working states of respective functional elements in the electronic device 1 in real time, and determine the amount of power consumption required by the electronic device at that time by the sum of rated powers of the functional elements that are in powered-on state. For example, it is assumed that, a power supply system is provided with three first power supplies, which are a first power supply A, a first power supply B and a first power supply C, respectively; and their rated power is 500 W, 1000 W, and 1500 W, respectively; when a TV presents a display image of 2D mode, a required power is 900 W, and then the control module 3 controls to turn on the first power supply B (i.e., to output a voltage to the TV), and turn off the first power supplies A and C (i.e., not to output voltages to the TV); when the TV is switched from 2D mode to 3D mode, the total required power is 1450 W, and then the control module 3 may further turn on the first power supply A; at this time, both the first power supply A and the first power supply B output voltages to the TV simultaneously, and the first power supply C is still turned off.

It should be noted that, the first embodiment differs from the second embodiment in that a control module is added in the second embodiment, and the description of the first embodiment is also applicable to the second embodiment, e.g., the power interfaces, the structure of the first power supplies and so on.

In the power supply system as illustrated in FIG. 3 of the present disclosure, the power supply states of the respective first power supplies 2 are flexibly controlled by the control module 3, which meets power supply demands of the whole device and further prolongs service lives of the first power supplies 2; the first power supplies are turned on if necessary, and are turned off if not necessary, so that the entire power supply system cam supply power more flexibly and conveniently.

Third Embodiment

Figure 4:
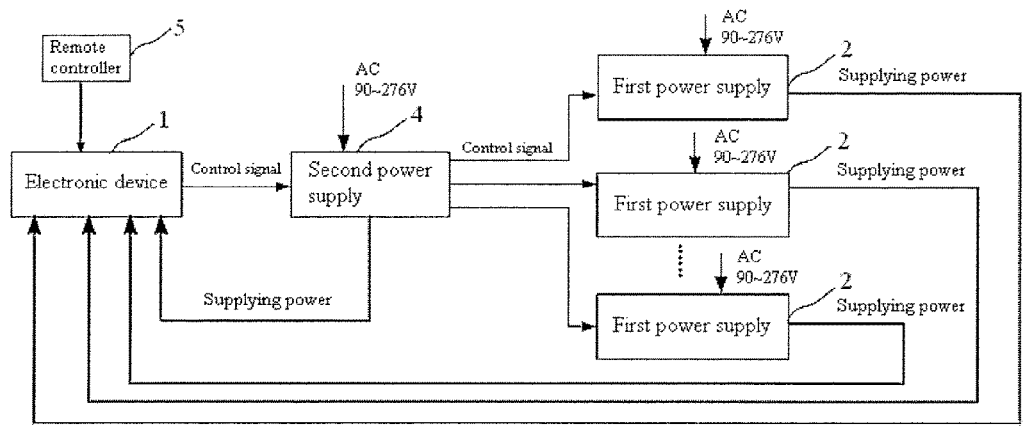
FIG. 4 is a structural schematic diagram of a power supply system provided by a third embodiment of the present disclosure.

Further, with reference to FIG. 4, on the basis of the power supply system (corresponding to FIG. 1) provided by the first embodiment, a power supply system provided by the third embodiment of the present disclosure further comprises: a second power supply 4 connected with the first power supplies 2 in series for supplying power to the electronic device 1, and the first power supplies 2 and the second power supply 4 supply power to the electronic device 1 at the same time.

The first power supplies 2 are connected with the second power supply 4 in series, so that the second power supply 4 provides control signals to the first power supplies 2. The first power supplies 2 and the second power supply 4 are connected with different power interfaces on the electronic device 1, and supply power to the electronic device 1 at the same time.

The connection manner between the power interface and the electronic device is similar to the connection manner of the power interface provided in the first embodiment, for example, the power interface may be connected with a SOC, or may be connected with respective functional modules (the functional modules may be, but not limited to, a timing control circuit, a backlight driving circuit, an acoustic system circuit, etc.) in the electronic device, which will be not repeated here.

For example, the respective first power supplies 2 and the second power supply 4 are connected with a plurality of power interfaces on the electronic device 1 one-to-one through power lines connected thereto, respectively; each power interface includes at least one live line interface and one naught line interface; and the power interfaces and a known power interface are similar in structure and function, which will be not repeated here.

After receiving the currents provided by one first power supply or more first power supplies 2 and the second power supply 4, the electronic device 1 inputs currents provided by one or more first power supplies 2 and the second power supply 4 into corresponding functional modules in the electronic device 1 simultaneously to achieve the purpose of driving the entire device to work. For example, the currents provided by the first power supplies 2 and the second power supply 4 may be received and allocated by a SOC, to supply power to respective functional modules, or the currents provided by the first power supplies 2 may be directly provided to corresponding functional modules connected thereto, to supply power to the respective functional modules.

In some embodiments, the second power supply is also used for providing a standby power supply to some circuits in the electronic device. For example, it may supply power to a chip responding to a remote controller, and the chip may be arranged on a certain circuit board of the electronic device, or may be arranged in the second power supply, which is not limited here.

Hereinafter, an example in which the electronic device is a TV and the power interfaces supply power to respective functional modules in the TV through a SOC is taken for description.

The electronic device at least includes a television SOC (briefly a TV SOC); for example, after alternating current (AC) plugs of the respective first power supplies 2 and the second power supply 4 are inserted for power supply, the TV SOC is controlled to be powered on and enabled, and then the first power supplies 2 and the second power supply 4 obtain AC inputs simultaneously (an AC voltage of 90~276V as illustrated in FIG. 4); when a remote controller 5 (or a control button on the TV) sends a TV start signal, the TV SOC transmits a high-level control signal to the second power supply 4, and then the second power supply 4 normally output respective groups of power supply voltages when triggered by the high-level control signal, and meanwhile the second power supply 4 transmits switching control signals to the switching control circuits of the first power supplies 2 to turn on a certain first power supply or several first power supplies 2, and the first power supply or supplies 2 which are turned on also normally output respective groups of power supply voltages, so that the first power supplies 2 and the second power supply 4 supply power to the TV SOC together. When the first power supplies are connected with the second power supply in series, the second power supply starts to supply power to the TV when the TV SOC is powered on to work; when the television requires more power supply while a lot of functions thereof are enabled, the second power supply controls turning on all or part of the first power supplies to supply power to the TV together. A timing control of the power supply system is relatively simple. The power supply system, of which the first power supplies and the second power supply are connected in series, has a relatively small standby power consumption.

In some embodiments, the TV SOC is controlled to be powered on and enabled via the remote controller 5. The structure and type of the remote controller 5 is not limited here, for example, the TV SOC is controlled to be powered on and enabled by an infrared remote controller. Of course, it is not limited to power on and enable the TV SOC via the remote controller, for example, the TV SOC may be manually enabled.

In the power supply system provided by the third embodiment, the electronic device directly triggers the second power supply to make it turned on, and the second power supply triggers the respective first power supplies to make them turned on while outputting power supply voltage(s), and this manner is easy to be implemented. When power interfaces connected with the first power supplies are directly connected with respective functional modules in the electronic device, the interface connected with the second power supply are connected with the SOC in the electronic device to provide a standby voltage for the SOC, for example, it is connected with the TV SOC in the television to provide a standby voltage to the TV SOC.

Fourth Embodiment

Figure 5:
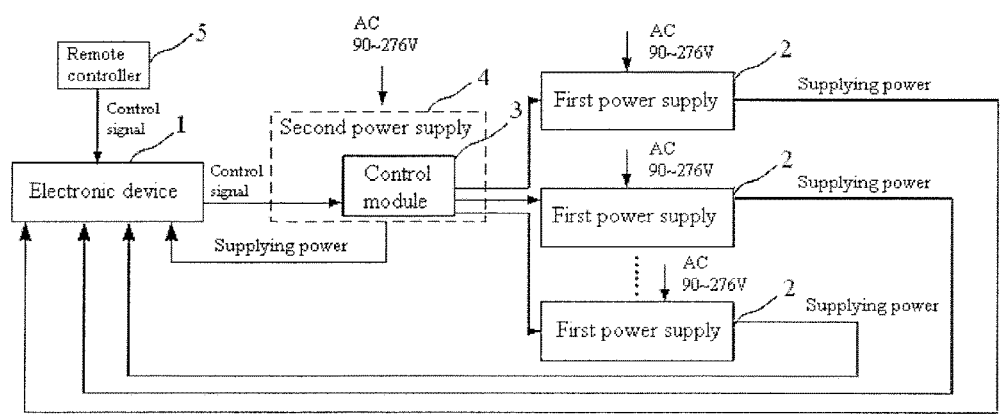
FIG. 5 is a structural schematic diagram of a power supply system provided by a fourth embodiment of the present disclosure.

Further, with reference to FIG. 5, on the basis of the power supply system (corresponding to FIG. 4) provided by the third embodiment, a power supply system provided by the fourth embodiment further comprises: a control module 3 arranged in the second power supply 4 or arranged between the second power supply 4 and the first power supplies 2, for controlling to turn-on and turn-off the first power supplies 2 based on the amount of electrical power required at that time, which amount is fed back by the electronic device 1 through the second power supply 4. The control module 3 has a structure and function similar to those of the control module 3 of the second embodiment (corresponding to FIG. 3), for example, it may be a control Integrated Chip (control IC) or a gate circuit.

The control module 3 may be arranged outside the second power supply 4, or may be arranged in the second power supply 4, and is integrated with respective functional modules of the second power supply 4. In the power supply system illustrated in FIG. 5, the control module 3 is integrated into the second power supply 4.

For example, after alternating current (AC) plugs of the respective first power supplies 2 and the second power supply 4 are inserted for power supply, the first power supplies 2 and the second power supply 4 obtain AC inputs simultaneously (an AC voltage of 90~276V as illustrated in FIG. 5), and a remote controller 5 controls the TV SOC to have it powered on and enabled, then the TV SOC turns on respective power supplies of the second power supply 4 while transmitting a high-level signal to the second power supply 4, and respective groups of voltages are normally output to the TV SOC; and the control module 3 controls to turn on a certain second power supply or several second power supplies according to the electrical power of the second power supply 4 and a power consumption required by the TV at that time, while controls to turn off the rest. When the remote controller 5 sends a TV shutdown signal, the TV SOC transmits a low-level signal to the control module 3; and the control module 3 controls to turn off respective power supplies of the first power supplies 2 and the second power supply 4 (i.e., power off), and controls the second power supply 4 to provide a standby voltage to the TV SOC.

Fifth Embodiment

Figure 6:
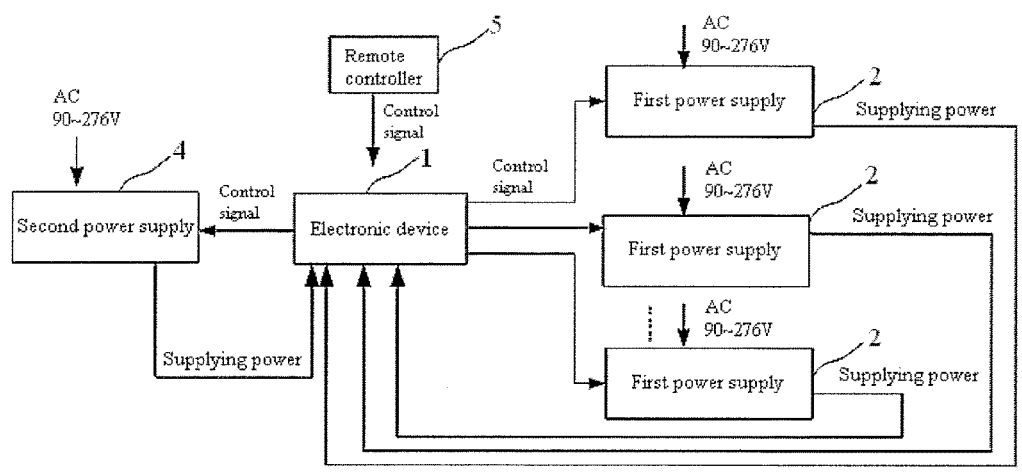
FIG. 6 is a structural schematic diagram of a power supply system provided by a fifth embodiment of the present disclosure.

Further, with reference to FIG. 6, on the basis of the power supply system (corresponding to FIG. 1) provided by the first embodiment, a power supply system provided by the fifth embodiment further comprises: a second power supply 4 connected with the first power supplies 2 in parallel for supplying power to the electronic device 1.

The first power supplies 2 and the second power supply 4 are connected with different power interfaces on the electronic device 1, and supply power to the electronic device 1 at the same time.

For example, the respective first power supplies 2 and the second power supply 4 are connected with a plurality of power interfaces on the electronic device 1 one-to-one through power lines connected thereto, respectively; each power interface includes at least one live line interface and one naught line interface; and the power interfaces and a known power interface are similar in structure and function, which will be not repeated here.

In some embodiments, the second power supply is also used for providing a standby power supply to some circuits in the electronic device. For example, it may supply power to a chip responding to a remote controller, and the chip may be arranged on a certain circuit board of the electronic device, or may be arranged in the second power supply, which is not limited here.

When the second power supply 4 is a standby power supply, the power supply interfaces are connected with the first power supplies and the electronic device in at least two connection manners. In the first manner, the power interfaces may be connected with a System On Chip (SOC, also called a TV SOC), the SOC controls current signals to supply power to a certain functional module or several functional modules (the functional modules may be, but not limited to, a timing control circuit, a backlight driving circuit, an acoustic system circuit, etc.) in the electronic device after receiving the current signals provided by the respective power supplies. The electronic device 1 inputs currents provided by the plurality of first power supplies 2 into corresponding functional modules in the electronic device 1 simultaneously to achieve the purpose of driving the whole device to work after receiving the currents provided by the plurality of first power supplies 2. In the second manner, the power interfaces may be connected with the functional modules in the electronic device, and after being powered on, the first power supplies 2 directly supply power to the functional modules connected thereto, achieving the purpose of supplying power to corresponding functional modules, respectively.

When the second power supply is used for providing a standby power supply for the SOC, the power interfaces connected with the second power supply are connected with the SOC at the same time, to supply standby power to the SOC in a standby state.

In some embodiments, the second power supply 4 may be one out of the first power supplies 2, or may be one power supply added additionally; for example, when there are two first power supplies 2, one may be set as the second power supply 4, and the other is the first power supply 2.

For example, after alternating current (AC) plugs of the respective first power supplies 2 and the second power supply 4 are inserted for power supply, the first power supplies 2 and the second power supply 4 obtain AC inputs simultaneously (an AC voltage of 90~276V as shown in FIG. 6); when a remote controller 5 sends a TV start signal, the TV SOC transmits high-level signals to the first power supplies 2 and the second power supply 4. The first power supplies 2 and the second power supply 4 are triggered to supply power to the electronic device 1 at the same time; before the remote controller 5 transmits a TV start signal and when the remote controller 5 sends a TV shutdown signal, the electronic device 1 controls the second power supply to provide a standby power supply to the electronic device, and controls to turn off the first power supplies 2.

Sixth Embodiment

Figure 7:
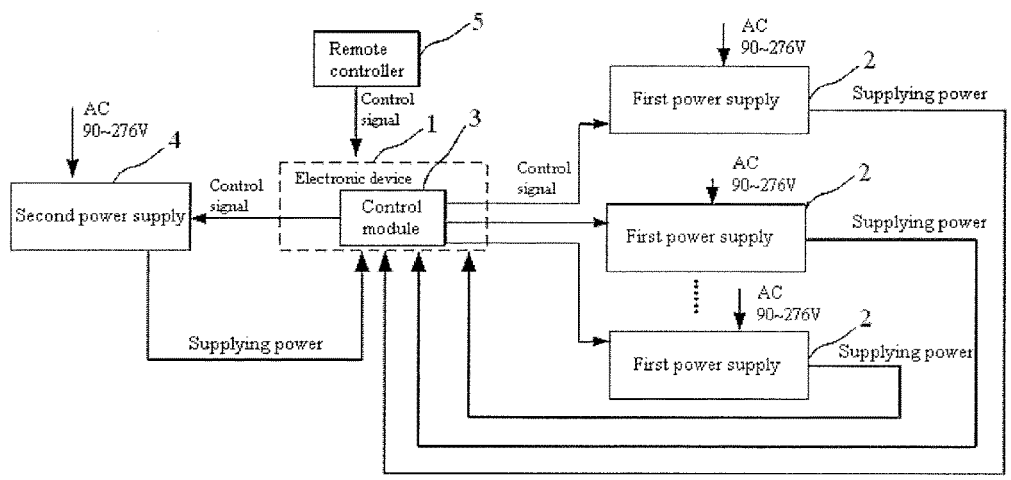
FIG. 7 is a structural schematic diagram of a power supply system provided by a sixth embodiment of the present disclosure.

Further, with reference to FIG. 7, on the basis of the power supply system (corresponding to FIG. 6) provided by the fifth embodiment, a power supply system provided by the sixth embodiment further comprises: a control module 3 arranged in the electronic device 1 or arranged between the electronic device 1 and the first power supplies 2 as well as the second power supply 4, for controlling turn-on and turn-off of the first power supplies 2 and the second power supply 4 based on the amount of electrical power required by the electronic device at that time. In other words, the control module 3 is connected with the electronic device 1 and connected with the first power supplies 2 and the second power supply 4 at the same time; the control module 3 is configured for controlling turn-on and turn-off of the first power supplies 2 and the second power supply 4 based on the amount of electrical power required by the electronic device at that time.

The difference from the power supply system provided by the fifth embodiment lies in that, the first power supplies 2 and the second power supply 4 in the power supply system provided by the fifth embodiment are started when the electronic device 1 is turned on, while the first power supplies 2 and the second power supply 4 in the power supply system provided by the sixth embodiment are controlled by the control module 3 to be turned on and turned off, and are turned on if necessary and turned off if not necessary; the control module 3 provided by the sixth embodiment and the power supply module provided by the second embodiment are similar in structure and function.

In some embodiments, the control module 3 is arranged in the electronic device 1.

In some embodiments, the second power supply 4 is a power supply having a standby power supply function.

FIG. 7 illustrates by taking an example in which the electronic device 1 is a TV and power interfaces supply power to respective functional modules in the TV through a SOC.

In some embodiments, the TV SOC 1 is controlled to be powered on and enabled via a remote controller 5. The structure and type of the remote controller is not limited here, for example, the TV SOC is controlled to be powered on and enabled by an infrared remote controller. Of course, it is not limited to power on and enable the TV SOC via the remote controller, for example, the TV SOC may be enabled manually.

For example, after alternating current (AC) plugs of the respective first power supplies 2 and the second power supply 4 are inserted for power supply, the first power supplies 2 and the second power supply 4 obtain AC inputs simultaneously (an AC voltage of 90~276V as shown in FIG. 7), the control module 3 controls the second power supply 4 to provide a standby power supply voltage to the TV SOC; when the remote controller 5 sends a TV start signal, the TV SOC transmits a high-level signal to the control module 3; and the control module 3 controls to turn on a certain one or several ones of the first power supplies 2 and the second power supply 4 according to power consumption required by the TV currently, and controls turning off the other power supplies. When the remote controller 5 sends a TV shutdown signal, the TV SOC transmits a low-level signal to the control module 3; and the control module 3 controls to turn off respective power supplies of the first power supplies 2 and the second power supply 4 (i.e., power off), and meanwhile controls the second power supplies 4 to provide a standby voltage to the TV SOC.

For example, the second power supply may be regarded as a main power board, or the second power supply may be regarded as a secondary power board. The main power board may provide a voltage to the TV when the TV starts to work, and provide a standby voltage when the TV is shut down.

The second power supplies provided in all embodiments of the present disclosure have a structure similar to that of the first power supply as illustrated in FIG. 2, and the second power supply further has a standby power supply function, which will be not repeated here.

In the power supply systems provided by the embodiments of the present disclosure, the electronic device is powered by at least two first power supplies which are independent of each other, the respective first power supplies are simple in structure and convenient to maintain, and accordingly, the entire power supply system is of a simple structure and can be conveniently maintained.

Further, in the embodiments of the present disclosure, a control module for controlling to turn on or turn off the first power supplies according to current electricity demands of the electronic device is arranged between the first power supplies and the electronic device, so as to flexibly control working states of the first power supplies (turning on or turning off). By controlling turning on and off the respective power supplies through a control module, the respective power supplies are selectively enabled under the control of the control module; as compared with the case in which a large number of power supply branch circuits are arranged in one power supply and power supply states of respective branches are directly controlled, the timing control of the power supply in the present disclosure is simple.

Furthermore, in the present disclosure, the electronic device is powered by a plurality of power supplies, and respective power supplies may be arranged on different boards and independent of each other, and this configuration may ensure cooling performance of the entire power supply system.

It is evident that those skilled in the art can make various changes or modifications to the present disclosure without departing from the spirit and scope of the present disclosure. Thus, if these changes and modifications to the present disclosure are within the scope of the claims of the present disclosure and equivalents thereof, the present disclosure also intends to include all such changes and modifications within its scope.

The present application claims priority of Chinese Patent Application No. 201310573353.6 filed on Nov. 15, 2013, the disclosure of which is incorporated herein by reference in its entirety as part of the present application.

The invention claimed is:

1. A power supply system, for supplying power to an electronic device, comprising:
   at least two first power supplies connected with each other in parallel,
   a second power supply connected with the first power supplies in parallel, and an electric device controller, wherein
   the electronic device controller is configured to send a start signal or a shutdown signal to the electronic device;
   the first power supplies and the second power supply are configured to be triggered by a high-level signal from the electronic device in response to the start signal sent to the electronic device, so as to supply a main power to the electronic device by the first power supplies and the second power supply simultaneously, and
   the first power supplies are further configured to be turned off while the second power supply is further configured to provide a standby voltage to the electronic device, before the electric device receives the start signal or under a control of the electronic device in response to the shutdown signal sent to the electronic device.

2. The power supply system according to claim 1, further comprising: a control module arranged in the electronic device or arranged between the electronic device and the first power supplies, configured for controlling turn-on and turn-off of the first power supplies based on an amount of electrical power required, which amount is fed back by the electronic device.

3. The power supply system according to claim 2, wherein the control module is a control integrated chip or a gate circuit.

4. The power supply system according to claim 1, further comprising: a second power supply connected with the first power supplies in series, configured for supplying power to the electronic device.

5. The power supply system according to claim 4, wherein the second power supply is configured for supplying a standby voltage to the electronic device when the electronic device is in a standby state.

6. The power supply system according to claim 4, further comprising: a control module arranged in the second power supply or arranged between the second power supply and the first power supplies, configured for controlling turn-on and turn-off of the first power supplies based on an amount of electrical power required, which amount is fed back by the electronic device through the second power supply.

7. The power supply system according to claim 6, wherein the control module is a control integrated chip or a gate circuit.

8. The power supply system according to claim 4, wherein the respective first power supplies and the second power supply correspond to a plurality of power interfaces arranged on the electronic device one-to-one, respectively.

9. The power supply system according to claim 1, further comprising: a control module arranged in the electronic device or arranged between the electronic device and the first power supplies plus the second power supply, configured for controlling turn-on and turn-off of the first power supplies and the second power supply based on an amount of electrical power required, which amount is fed back by the electronic device.

10. The power supply system according to claim 9, wherein the control module is a control integrated chip or a gate circuit.

11. The power supply system according to claim 1, wherein each first power supply at least includes a first rectifying filter for receiving an AC voltage, a transformer connected with the first rectifying filter, and a second rectifying filter connected with the transformer, for outputting a power supply voltage.

12. The power supply system according to claim 1, wherein the respective first power supplies and the second power supply correspond to a plurality of power interfaces arranged on the electronic device one-to-one, respectively.

* * * * *